United States Patent [19]

Sakurai et al.

[11] Patent Number: 5,675,494
[45] Date of Patent: Oct. 7, 1997

[54] VEHICLE-MOUNTED UNIT FOR AN AUTOMATIC TOLL COLLECTION SYSTEM THAT PREVENTS DOUBLE TOLL CHARGING

[75] Inventors: Takashi Sakurai, Nagoya; Manabu Matsumoto, Handa, both of Japan

[73] Assignee: Nippondenso Co., Ltd., Kariya, Japan

[21] Appl. No.: 503,911

[22] Filed: Jul. 18, 1995

[30] Foreign Application Priority Data

Jul. 19, 1994 [JP] Japan .................. 6-166988
May 15, 1995 [JP] Japan .................. 7-115932

[51] Int. Cl.$^6$ .................................. G06F 17/60
[52] U.S. Cl. ................. 364/464.27; 364/464.28
[58] Field of Search .................. 340/928, 825.54; 364/464.01, 467, 464.27, 464.28; 393/213

[56] References Cited

U.S. PATENT DOCUMENTS

| | | | |
|---|---|---|---|
| 3,231,854 | 1/1966 | Gran | 340/928 |
| 3,257,640 | 6/1966 | Beaven | 340/928 X |
| 4,212,069 | 7/1980 | Baumann | 364/467 |
| 4,303,904 | 12/1981 | Chasek | 340/825.54 X |
| 5,086,389 | 2/1992 | Hassett et al. | 364/401 R |
| 5,144,553 | 9/1992 | Hassett et al. | 364/401 R |
| 5,378,887 | 1/1995 | Kobayashi | 235/492 |
| 5,424,727 | 6/1995 | Shieh | 340/928 |
| 5,428,353 | 6/1995 | Bird | 340/933 |

FOREIGN PATENT DOCUMENTS

| | | |
|---|---|---|
| 0401192 | 12/1990 | European Pat. Off. . |
| 0585718 | 3/1994 | European Pat. Off. . |
| 2112721 | 4/1990 | Japan . |
| 4315282 | 11/1992 | Japan . |
| 6131590 | 5/1994 | Japan . |

*Primary Examiner*—Edward R. Cosimano
*Attorney, Agent, or Firm*—Cushman, Darby & Cushman IP Group of Pillsbury Madison & Sutro LLP

[57] ABSTRACT

After a vehicle-mounted unit determines that a vehicle has entered a toll chargeable area, if communication is determined to be allowable through a flag, communication operations are performed and after finishing communication operations, the flag is set and communication operations thereafter are prohibited. Next, the unit determines if a travel distance has exceeded a toll chargeable distance. The travel distance is measured by counting the number of vehicular speed pulses received after the end of the communication operations, and the toll chargeable distance is set to be equal or greater than the travel distance needed by the vehicle to enter the communication area and leave it. If it is determined that travel distance has exceeded toll chargeable distance, the flag is reset, communication prohibition is released and communication thereafter is allowed.

22 Claims, 7 Drawing Sheets

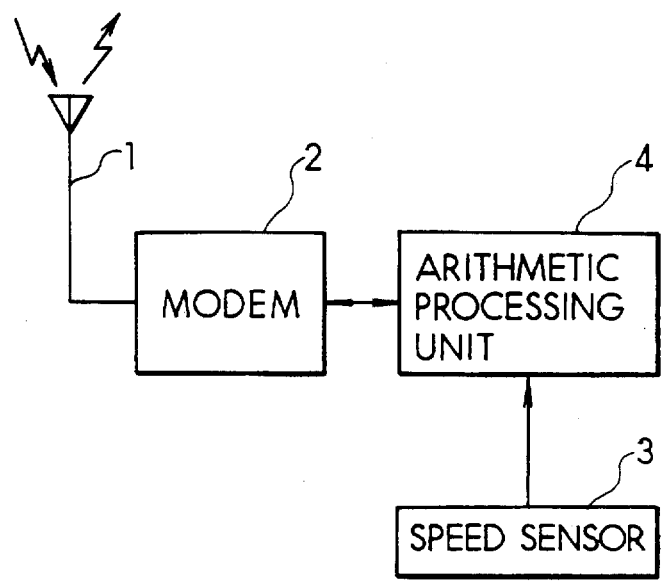
FIG. 1
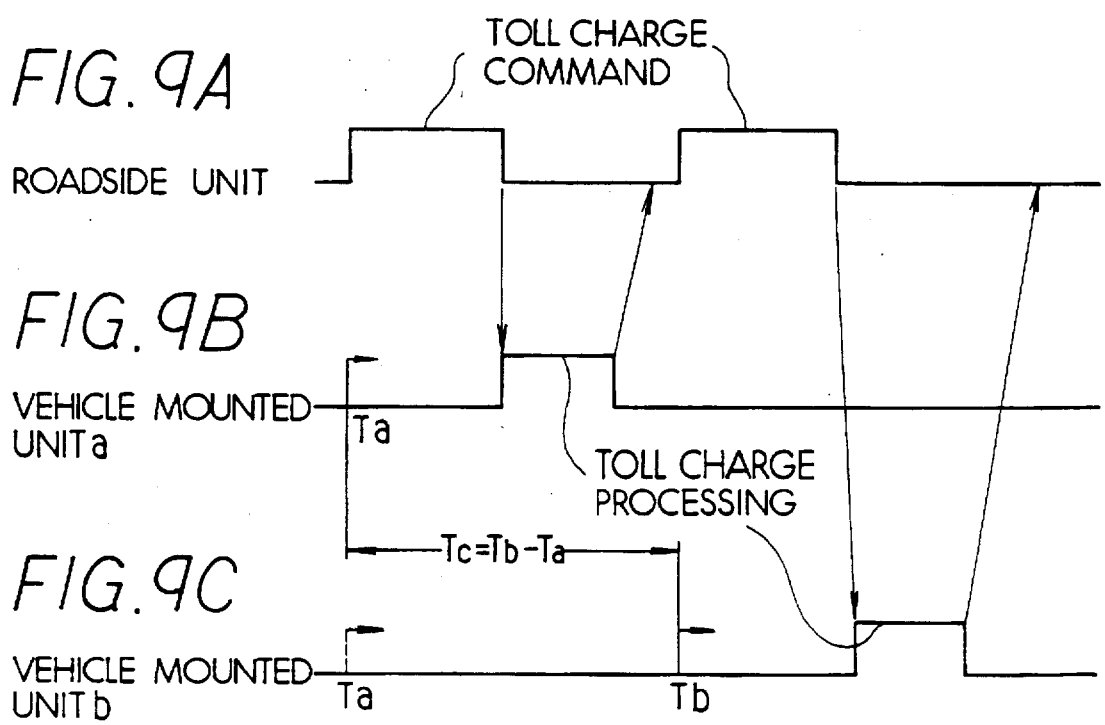
FIG. 9A ROADSIDE UNIT
FIG. 9B VEHICLE MOUNTED UNIT a
FIG. 9C VEHICLE MOUNTED UNIT b FIG. 8A
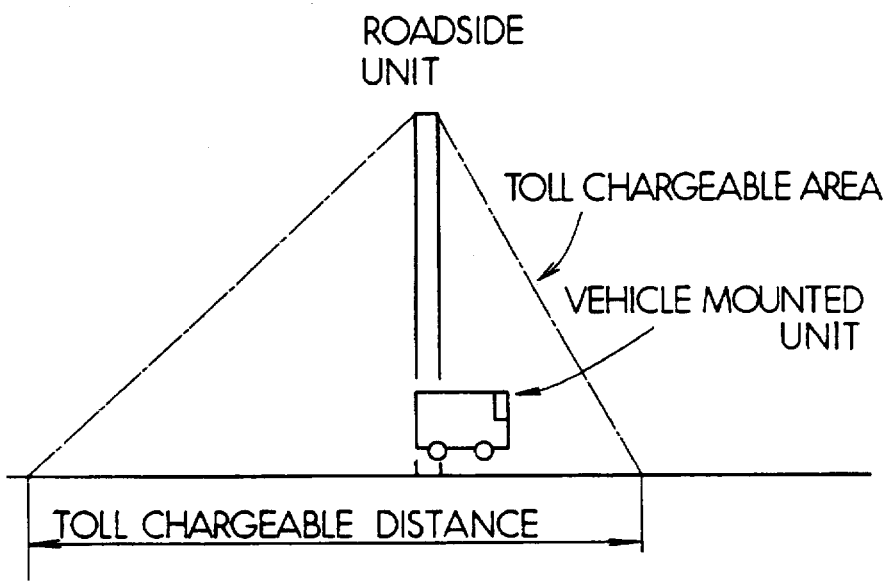
FIG. 8B
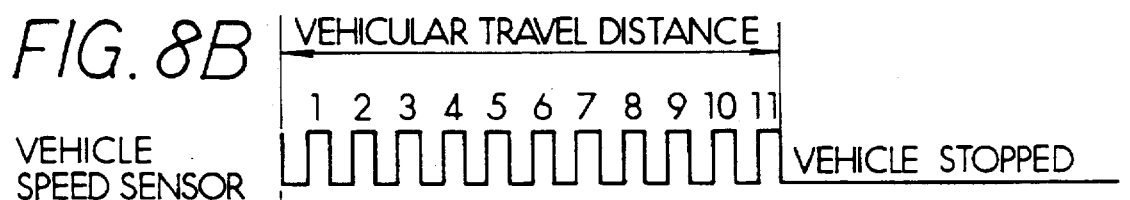
FIG. 8C
FIG. 8D
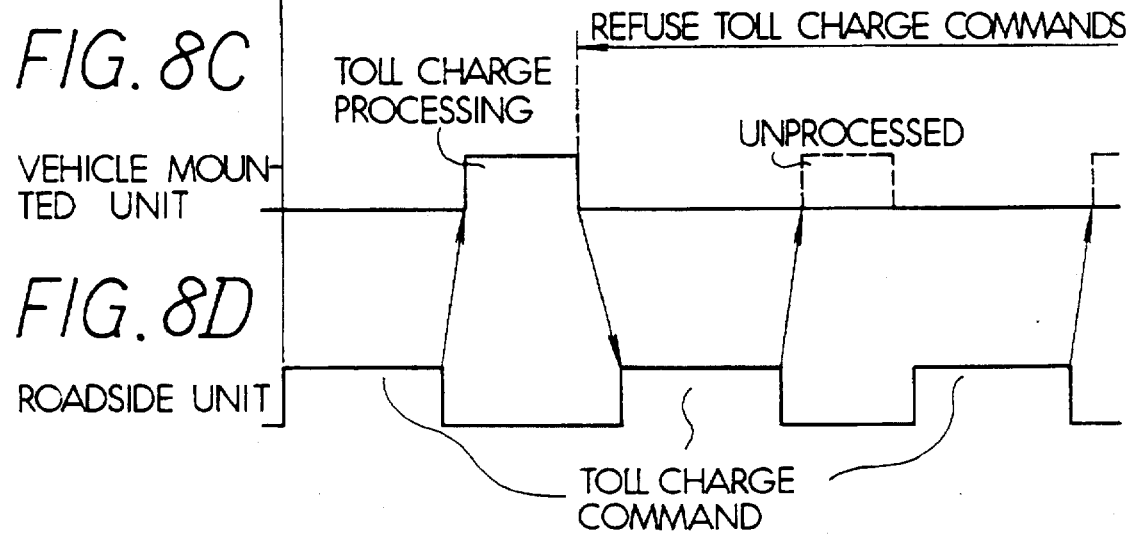

VEHICLE-MOUNTED UNIT FOR AN AUTOMATIC TOLL COLLECTION SYSTEM THAT PREVENTS DOUBLE TOLL CHARGING

CROSS-REFERENCE TO RELATED APPLICATIONS

This application is related to and claims priority from Japanese Patent Application Nos. Hei-6-166988 and Hei-7-115932, the contents of which are hereby incorporated by reference.

BACKGROUND OF THE INVENTION

1. Field of the Invention

This invention relates to a vehicle-mounted unit of an automatic toll collection system. More specifically, this invention relates to a vehicle-mounted unit of an automatic toll collection system devised to prevent double toll charging.

2. Description of Related Art

In general, automatic toll collection systems which automatically collect toll fees for toll roads include a roadside unit made up of communication equipment or the like set up on the toll road side, and a vehicle-mounted unit. Automatic toll collection systems involve communication on toll charges or the like between roadside units and vehicle-mounted units.

For the automatic toll collection system, toll charging is performed several times if the vehicles stays in the toll chargeable area for a long time due to traffic, accidents or the like and thus, in consideration of the inconvenience of multiple toll charges, the vehicle-mounted unit must have a double toll charging prevention mechanism to prevent double toll charging.

As a conventional vehicle-mounted apparatus devised to prevent double toll charging, a well-known vehicle-mounted apparatus (see Japanese Patent Laid Open Publication No. 6-131590) includes a toll charging prohibition device for prohibiting toll charging after the end of a first toll charging process, an elapsed time measuring device that measures elapsed time after the end of the first toll charging process and a toll charging prohibition release device for releasing the toll charging prohibition when the elapsed time exceeds a predetermined amount of time.

However, for the above conventional apparatus, because the release of the toll charging prohibition is based on elapsed time, one problem is deciding how much time should be set as the predetermined amount of time. That is, because double toll charging has to be prevented even during heavy vehicular traffic and malfunctions which rarely happen, then a large amount of time should be set as the predetermined amount of time. On the other hand, setting the predetermined time too long leads to problems like the inability to perform communication during high-speed cruising due to the non-release of the toll charging prohibition even when the vehicle has entered the next toll chargeable area.

SUMMARY OF THE INVENTION

In consideration of these problems, the present invention aims to provide a vehicle-mounted unit that simplifies the setting of the standard for releasing the toll prohibition and moreover, reliably prevents double toll charging irrespective of conditions such as vehicular traffic, malfunctions, high-speed cruising or the like.

To achieve these aims, a first aspect of the present invention provides a vehicle-mounted unit of an automatic toll collection system which includes a toll charge processing device for executing a toll charging process by performing predetermined communication operations between the vehicle and the interrogator when the vehicle is located at an area where it can receive toll charge commands from the interrogator, a toll charging prohibition device which prevents the toll charge processing device from executing further toll charging operations after the end of the first toll charging process of the toll charge processing device, a travel distance measuring device for measuring the distance of the vehicle from its location during the execution of the first toll charging process, and a toll charging prohibition continuation device for continuing the toll charging prohibition until the travel distance measured by the travel distance measuring device reaches a maximum toll chargeable distance corresponding to the size of the toll chargeable area.

In this way, toll charging prohibition is continued until the travel distance of the vehicle starting from the point where the first toll charge operation is performed for the vehicle reaches a toll chargeable distance which corresponds to the size of the toll chargeable area. In other words, with this first aspect of the present invention, the standard for releasing the toll charge prohibition is based on the travel distance. Setting the toll chargeable distance is easy because it is set according to the size of the toll chargeable area. Moreover, by setting the travel distance as the standard, it is possible to accurately determine if the vehicle is within the toll chargeable area irrespective of vehicle traffic and vehicular high-speed cruising and thus double toll charging is reliably prevented.

In addition, according to a second aspect of the present invention, the vehicle-mounted unit of an automatic toll collection system further includes a toll charging prohibition release device for releasing the toll charging prohibition after a predetermined amount of time elapses after the travel distance measured by the travel distance measurement device reaches a toll chargeable distance which corresponds to the size of the toll chargeable area.

In this way, toll charging prohibition is maintained for a certain period of time even after the vehicle leaves the toll chargeable area. Thus, double toll charging is prevented even though the vehicle temporarily goes back to the toll chargeable area for some reason (e.g., accidents, obstacles, etc.) after leaving the toll chargeable area.

Moreover, in a third embodiment of the present invention, the vehicle-mounted unit of an automatic toll collection system includes travel distance measurement device that starts measuring the travel distance of the vehicle starting from the position of the vehicle when the toll charge processing device started the first toll charging process.

Accordingly, in this aspect the time during the execution of the first toll charging process is the time the toll charge processing device starts the first toll charging process. In this way, because the travel distance measurement device begins measuring the travel distance from the location of the vehicle when the communication device started the first toll charge process, the time for starting the measurements of the travel distance coincides with the time the vehicle enters the toll chargeable area. Thus, since the travel distance coincides with the toll chargeable distance, the toll charge prohibition is released immediately after the vehicle leaves the toll chargeable area or after a predetermined amount of time lapses after the vehicle leaves the toll chargeable area and because of this, preparations are reliably performed for the toll charge process of the next toll chargeable area.

Furthermore, a fourth embodiment of the present invention provides a vehicle-mounted unit of an automatic toll collection system where the travel distance measurement device includes a CPU, a signal interface connected to the CPU and a vehicle-speed sensor, a toll charging start detector which generates a detection signal after detecting the start of the first toll charging process and a level converter which generates the pulse signal from the vehicular speed sensor after level conversion. According to this aspect, the CPU begins computation of the vehicle-speed pulses based on the output signal from the level converter after receiving the detection signal from the toll charging start detector.

In this aspect, a level converter is provided to convert the pulse signal from the vehicular speed sensor to a pulse signal appropriate to the input level of the CPU because output levels of different types of vehicular speed sensors vary. Thus, the provision of the level converter allows use of the invention with different types of vehicular speed sensors. Moreover, because travel distance measurements or the like are performed by the CPU, there is no need to provide a hardware circuit for measuring travel distance; thus, circuit construction becomes simple.

Moreover, a fifth embodiment of the present invention provides a vehicle-mounted unit of an automatic toll collection system where the travel distance measurement device includes a CPU, a signal input interface connected to the CPU and a vehicle speed sensor, and a toll charging start detector which sends a detection signal to the CPU when it detects the start of the toll charging process. According to this aspect, the signal input interface includes a level converter which generates an output signal from the vehicle speed sensor after level conversion, a measurement counter which starts the computation of the vehicle speed pulse counts based on the output signal from the level converter when a computation start command signal is received from the CPU which received the detection signal from the toll charge start detector, a setting counter where a predetermined value that corresponds to the toll chargeable distance is set, and a comparator which compares the predetermined value of the setting counter and the computed value of the measurement counter and provides a coincidence signal to the CPU when both of the values stored in the counters are equal.

In this way, similar to the fourth aspect, the provision of the level converter allows the use of the vehicle-mounted unit of an automatic toll collection system with different types of vehicular speed sensors. At the same time, the load of the CPU is lighter and a low-energy consumption mode is realized because distance measurements and the like are performed by hardware such as measurement counters, setting counters and comparators.

In yet another aspect of the present invention, a vehicle-mounted unit of an automatic toll collection system further includes an IC card for storing toll charge information, where the CPU also serving as the toll charge processing device performs input and output operations of the toll-charge information on the IC card through a card interface.

Here, toll charge information such as account number, balance information and the like are stored in and read from the IC card.

Moreover, in another aspect of the present invention, the vehicle-mounted unit of the automatic toll collection system includes a RAM for storing toll charge information and the CPU also serving as the toll charge processing device performs toll charge processes by reading and writing information stored in the RAM.

In this way, toll charge information such as account number, balance information and the like are stored in and read from the RAM.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is a block diagram showing the construction of a vehicle-mounted unit of an automatic toll collection system according to a first embodiment of the present invention;

FIGS. 8A-8D are explanatory drawings showing other examples of operations of the vehicle-mounted unit; and FIGS. 9A-9C are explanatory drawings showing further examples of the operations of the vehicle-mounted unit.

DETAILED DESCRIPTION OF THE PRESENTLY PREFERRED EXEMPLARY EMBODIMENTS

The preferred embodiments of the present invention are described hereinafter with reference to the accompanying drawings.

Figure 2:
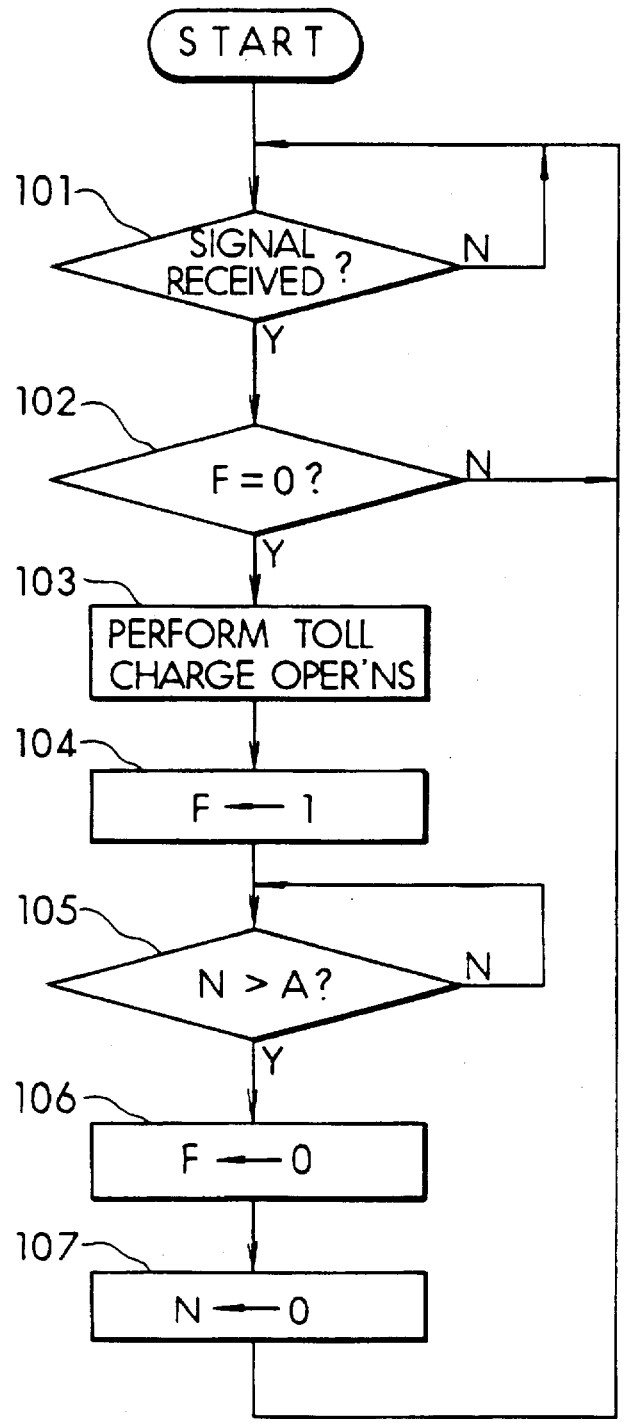
FIG. 2 is a flowchart of the double toll charging prevention process.
Figure 3:
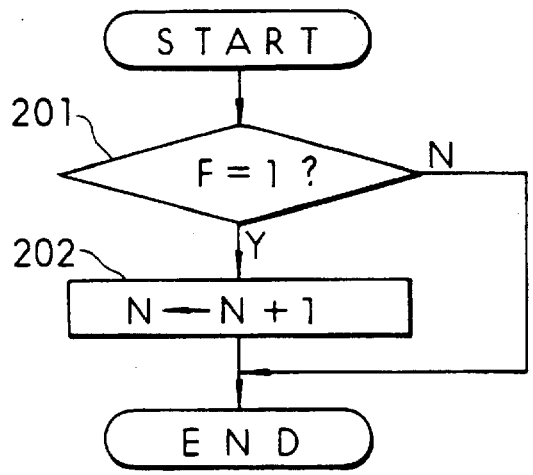
FIG. 3 is a flowchart of the travel distance measurement process.

FIG. 1 is a block diagram of a vehicle-mounted unit of an automatic toll collection system according to a first embodiment of the present invention while FIGS. 2 and 3 are flowcharts that show its operations.

As shown in FIG. 1, the vehicle-mounted unit includes a transceiving antenna 1, a modem 2 having a demodulator for demodulating the received signals and a modulator for modulating signals to be sent, a vehicular speed sensor 3 and an arithmetic processing circuit 4 for performing computational operations on data sent and received and for executing the double toll charge prevention operation to be described later.

The arithmetic processing unit 4 performs a double toll charging prevention operation as shown in FIG. 2. This double toll charging prevention operation is explained below.

First, Step 101 determines if a radio wave (toll charge command) has been received based on a received signal transmitted from an interrogator (i.e., a roadside unit which is not shown in the figure) after sequentially passing through the receiving antenna 1 and the modulator of modem circuit 2. In other words, this step determines if the vehicle has entered the toll-chargeable area.

After determining that a radio signal has been received, Step 102 determines if a flag F is "0". Here, if flag F is set to "0", communication is allowed and if flag F is set to "1", communication is prohibited. If the result of the determination in either of Steps 101 or 102 is negative, execution returns to Step 101.

Toll charge operations can be performed in Step 103 when flag F is set to "0" because flag F is set to "0" immediately after the vehicle enters the toll chargeable area. Toll charge operations may include storing toll charge data, receiving vehicle type and vehicle ID data and the like.

After finishing toll charge processing, flag F is set to "1" in Step 104 and communication thereafter is prohibited.

Next, Step 105 determines if travel distance N has exceeded toll chargeable distance A. Here, travel distance N is measured using the process shown in FIG. 3 which is executed every time a vehicular speed pulse is generated from vehicular speed sensor 3. The measurement of travel distance N is performed by first checking in Step 201 to see if flag F has been set to "1", thus indicating a toll charging operation has been terminated, and if so, counting the number of vehicular speed pulses received in Step 202. In other words, measurement of travel distance N begins from the location of the vehicle when the toll charging operation is terminated. Moreover, toll chargeable distance A is set according to the size of the toll chargeable area and is equal to or greater than the distance needed for the vehicle to exit the toll chargeable area after entering it. If, however, flag F has not been set to "1", execution of the travel distance measurement routine shown in FIG. 2 ends.

After determining that travel distance N has exceeded toll chargeable distance A in Step 105, in other words, after determining that the vehicle has exited the toll chargeable area, flag F is reset to "0", communication prohibition is released and communication allowed in Step 106 together with resetting travel distance N to "0" in Step 107. If, on the other hand, Step 105 determines that travel distance N has not exceeded toll chargeable distance A, execution returns to Step 105.

From the above explanation, it is clear that the vehicle-mounted unit according to the first embodiment of the present invention continues the toll charge prohibition until the travel distance from the location of the vehicle at the end of the first toll charging operation reaches a predetermined toll chargeable distance that corresponds to the size of the toll chargeable area. In other words, the basis for releasing the toll charge prohibition is the travel distance. In this way, because the toll chargeable distance is set according to the size of the toll chargeable area, the standard for releasing the toll charge prohibition is easily set. Moreover, with travel distance as the basis, it is possible to accurately determine if the vehicle is inside the toll chargeable area irrespective of heavy vehicular traffic and high-speed cruising, and therefore, double toll charging is reliably prevented.

Figure 4:
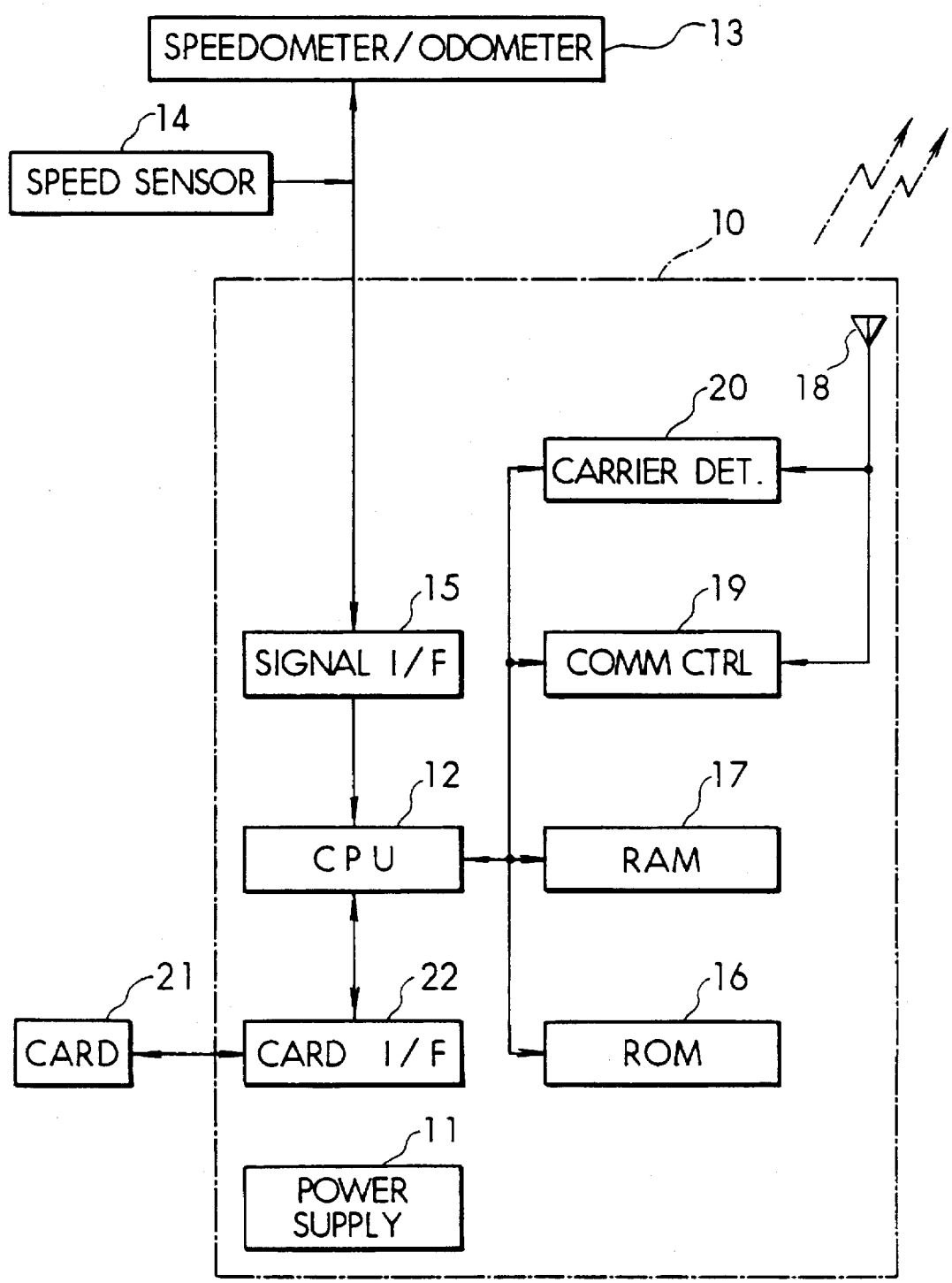
FIG. 4 is a block diagram of the vehicle-mounted unit according to a second embodiment of the present invention.

FIG. 4 shows a block diagram of the vehicle-mounted unit according to the second embodiment of the present invention. In FIG. 4, vehicle-mounted unit 10 includes a power supply circuit 11 for supplying electric power to each of the circuit elements, and a CPU 12. Vehicular speed sensor 14, which is connected to speedometer/odometer 13, is connected to the input side of CPU 12 through input signal interface 15.

Moreover, ROM 16 where programs and static information connected to CPU 12. This card interface 22 enters and reads toll charge information in IC card 21 where account numbers, balances and the like are stored.

Figure 5:
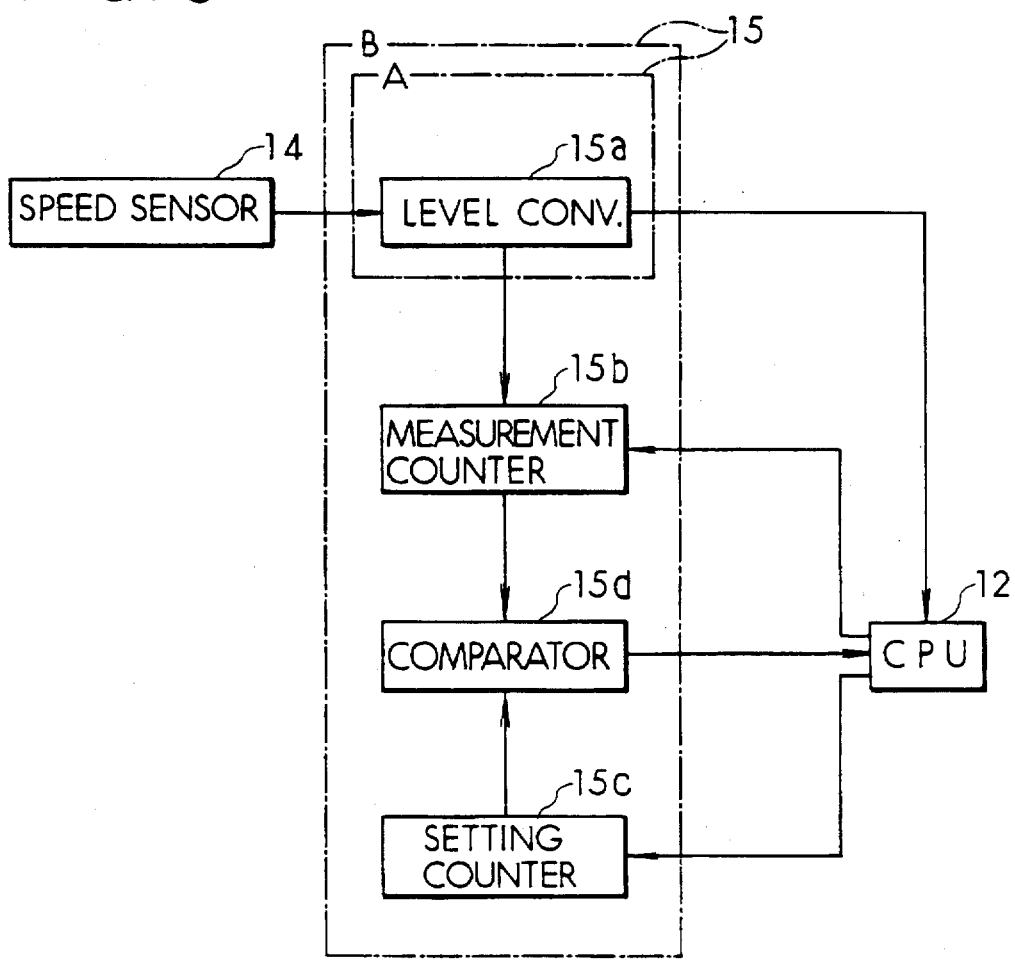
FIG. 5 is a block diagram showing the input signal interface.

The construction of input signal interface 15 is shown in FIG. 5.

In box A of FIG. 5, input signal interface 15 is constructed from level converter 15a. Level converter 15a, in correspondence with differing output levels according to type of vehicular speed sensor 14, converts the pulse or analog signal of the speed sensor 14 to a level appropriate for the input level of CPU 12, and provides the signal to CPU 12. Carrier detector 20 (shown in FIG. 4) receives the toll charge commands for the vehicle-mounted unit 10 regardless of whether the commands are for its vehicle or other vehicles, and if the received signal exceeds a predetermined level, carrier detector 20 wakes up CPU 12 to begin computing the number of output pulses of the level converter 15a; in other words, it starts measuring the travel distance of the vehicle. In this way, by providing level converter 15a inside input signal interface 15 as shown in FIG. 5, measurement of the travel distance of the vehicle based on the output signal of each vehicular speed sensor 14 is performed. Moreover, because CPU 12 computes the travel distance, there is no need for special hardware for measuring the travel distance and thus circuit construction is made simpler.

Alternatively, as shown in box B of FIG. 5, input signal interface 15 may include level converter 15a similar to the one used in box A of FIG. 5, a measurement counter 15b, a (e.g., the uniform toll chargeable distance information if all the toll chargeable areas have uniform sizes) are stored, RAM 17 where information needed for the operations of CPU 12 as well as toll charge information (account number, balance amount, toll chargeable distance information and the like) are stored, and communication controller 19 which controls communication with the roadside unit through antenna 18, are all connected to CPU 12.

Toll chargeable distance is explained below. If the toll chargeable distance of all the roadside units is uniform, the toll chargeable distance is stored in ROM 16. If toll chargeable distance is different for each roadside unit, toll chargeable distance information is included in the toll charging command to be explained later and is stored in RAM 17 when vehicle-mounted unit 10 receives the toll charge command.

In addition, a carrier detector 20 is connected to CPU 12. This carrier detector 12 receives toll charge commands (information such as the ID of the vehicle-mounted unit, usage charge, toll chargeable distance including toll charge commands for other vehicle-mounted units 10) from the roadside unit and generates a wake-up signal to CPU 12 that wakes the CPU 12 from a sleep mode (a mode where the system clock is not running and the operations of the CPU are at a standstill) to a RUN mode (a mode where the CPU is in operation with the machine clock being supplied to it) when the received signal exceeds a predetermined level. This wake-up signal is provided to CPU 12 only when the received signal of the carrier detector 20 exceeds a predetermined level. Furthermore, a card interface 22 is setting counter 15c and a comparator 15d. CPU 12 sends a reset signal (computation commencement command signal) to measurement counter 15b when it receives a wake-up signal from carrier detector 20. Measurement counter 15b starts computation of the output pulses from level converter 15a when it receives this reset signal. During this time, the toll chargeable distance read from ROM 16 or RAM 17 is set in setting counter 15c. Comparator 15d compares the toll chargeable distance of setting counter 15c with the computed value from measurement counter 15b and provides a coincidence signal as an interrupt to CPU when both values coincide. According to the input signal interface 15 shown in B of FIG. 5, the provision of level converter 15a enables measurements of travel distance of the vehicle based on the output signals of the various types of vehicle speed sensors 14 and at the same time, lightens the load of CPU 12 up to the receipt of the coincidence signal from comparator 15b because travel distance measurements or the like are performed using hardware consisting of measurement counter 15b, setting counter 15c and comparator 15d.

Figure 6:
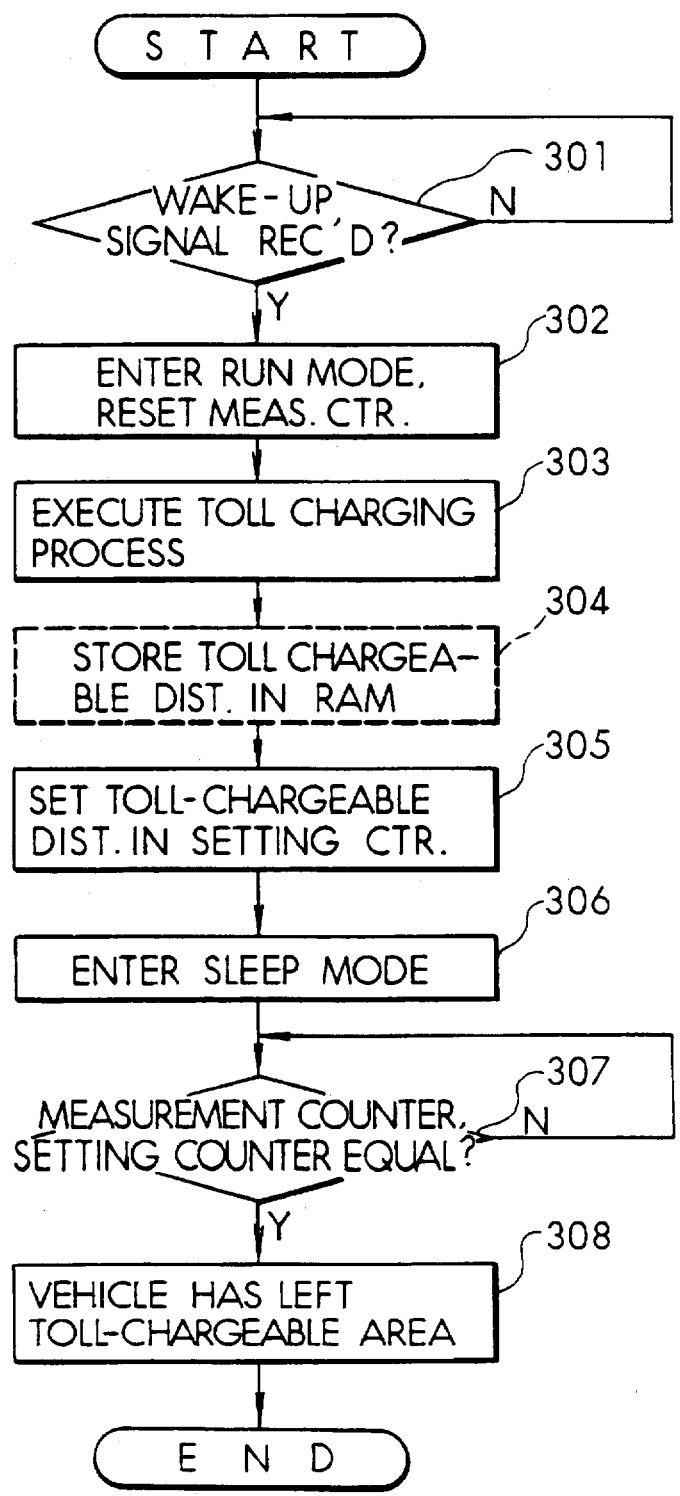
FIG. 6 is a flowchart showing the operation of the vehicle-mounted unit.
Figure 7A:
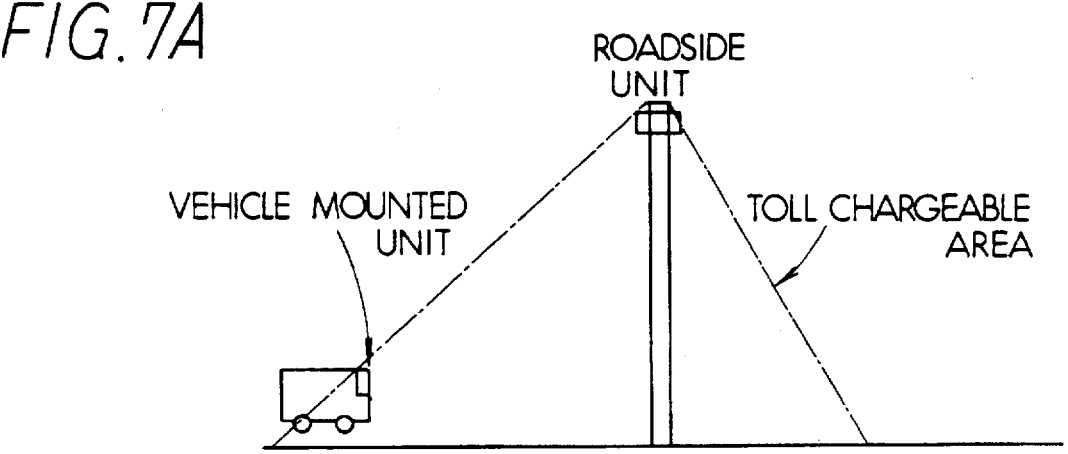
FIGS. 7A-7E are explanatory drawings showing an example of the operation of the vehicle-mounted unit.
Figure 7B:
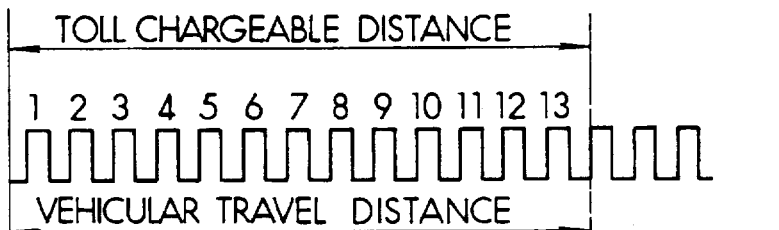
Figure 7C:
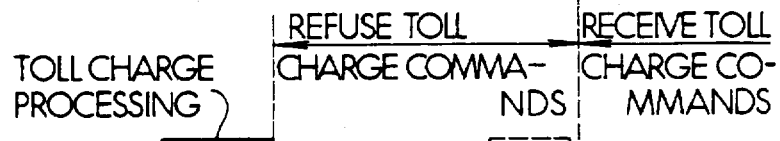
Figure 7D:
Figure 7E:
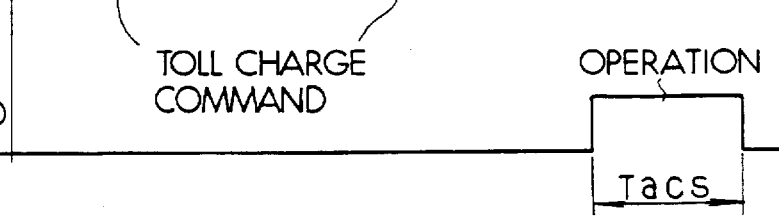

The main operations of the vehicle-mounted unit 10 that uses the input signal interface shown in box B of FIG. 5 are shown in FIG. 6.

First, if a wake-up signal, which is generated based on the level of the first toll charge command received from the carrier detector for the vehicle-mounted unit of this vehicle or the other vehicles, has been received in Step 301, switching to RUN mode from sleep mode is performed and a reset signal is provided to measurement counter 15b in Step 302. Measurement counter 15b resets upon receiving this reset signal and begins computation of the number of output pulses of level converter 15a.

After the execution of step 302, CPU 12 begins the toll charging process in Step 303 based on the first toll charging command to the vehicle on which it is mounted. For the toll charge processes, there are processes such as the writing the updated balance on IC card 21 after deducting the usage charge in the toll charge command from the balance stored in IC card 21 and sending the account number in case of credit or the like. Next, if toll chargeable distance is not fixed because of differing toll chargeable areas, CPU 12 stores the toll chargeable distance information included in the toll charge command from the roadside unit in RAM 17 in Step 304. Next, toll chargeable distance information is read from RAM 17 (if the toll chargeable distance is fixed, toll chargeable distance information is read from ROM 16) and the predetermined value which represents the toll chargeable distance is set in counter 15c in Step 305.

After finishing its toll charge operations, CPU 12 transits from the RUN mode to the sleep mode in Step 306. In Step 307, comparator 15d determines if the computed value of measurement counter 15b equals the toll chargeable distance of setting counter 15c and if both values are equal, comparator 15d generates a coincidence signal as an interrupt to CPU 12 (if Step 307 determines that both values are not equal, execution returns to step 307). Thus, the load is lighter because CPU 12 is in the sleep mode from the end of the toll charge process until the receipt of the coincidence signal. Moreover, after CPU 12 transits from the RUN mode to the sleep mode, a toll charge command is not received even if the roadside unit sends that toll charge command again because no wake-up signal is generated from the carrier detector 20. Thus, CPU 12 which received the coincidence signal as the interruption signal concludes that the vehicle has left the toll chargeable are and prepares the toll charge operations for the next toll chargeable area in Step 308.

Therefore, as shown in FIGS. 7A–7E, when the vehicle smoothly passes through the toll chargeable area, the vehicle-mounted unit begins measuring the travel distance of the vehicle from the start of the receipt of the first toll charge command for the vehicle, refuses acceptance of later toll charge commands after finishing the toll charge operations for the first toll charge command, and when the travel distance equals the toll chargeable distance later, CPU 12 begins accepting the toll charge commands thereafter.

Meanwhile, if input signal interface 15 shown in box A of FIG. 5 is used, CPU 12 itself refuses to accept the toll charge commands because it is still in the RUN mode after the end of the toll charge operations.

Moreover, while the foregoing embodiment of the present invention employs a construction where, as noted above, the acceptance of toll charge commands starts from the moment the travel distance equals toll chargeable distance, as shown in FIGS. 7B–7E, a different construction can also be employed where a timer provided for the vehicle-mounted unit is activated for a predetermined period of time Tacs after the travel distance equals the toll chargeable distance and in which receiving toll charge commands begins only after the predetermined period of time Tacs lapses. In this way, by prohibiting the acceptance of the toll charge command for the vehicle for a predetermined period of time after the vehicle leaves the toll chargeable area, double toll charging is prevented in case the vehicle returns to the toll chargeable area for a certain reason (e.g., an accident, obstacles or the like) after leaving it.

Also, by providing a tail-light signal (which is, as generally known, the signal generated when the reverse gear of a vehicle is entered and the tail-lights light up) to the vehicle-mounted unit 10, a construction where the computed value of the counter is decremented the instant the back signal is received, and where the acceptance of the toll charge command is again prohibited when the computed value of the counter has decreased to the predetermined value that indicates the toll chargeable distance can also be employed.

In addition, a navigation system that uses a GPS (Global Positioning System) or other navigation system can also be used for the measurement of the travel distance. In other words, travel distance measurement can be performed by incorporating these navigation systems in the vehicle-mounted unit or by communication using information exchanged through an interface.

On the other hand, in case the vehicle stops within the toll chargeable area due to traffic, malfunction or the like, as shown in FIGS. 8A–8D, because the travel distance never reaches the toll chargeable distance due to vehicle stoppage, the prohibition of the acceptance of the toll charge command starting from the end of the first toll charge command is continued thereafter, and the acceptance of the toll charge commands is only allowed when travel distance reaches toll chargeable distance after the vehicle starts to move again. Therefore, double toll charging is not performed even if the vehicle stays within the toll chargeable area for a long time.

Moreover, FIGS. 9A–9C show the operation of the vehicle-mounted unit b of a certain vehicle when it enters the same toll chargeable area at almost the same time as another vehicle during which the vehicle-mounted unit b of that vehicle receives its first toll charge command after vehicle-mounted unit a of the other vehicle received its first toll charge command. For this case, if the measurement of the travel distance of the vehicle equipped with vehicle-mounted unit b is started simply from the time vehicle-mounted unit b received the first toll charge command, the measurement of the travel distance of the vehicle mounted with vehicle-mounted unit b is delayed by Tc=Tb–Ta (Ta is the time the other vehicle-mounted unit a began receiving the first toll charge command) and thus, there is a decline in the accuracy of measuring travel distance. To deal with this, in the foregoing embodiment, irrespective of whether the toll charge command is the first toll charge command for vehicle-mounted unit a of the vehicle in question or the first toll charge command for vehicle-mounted unit b of the other vehicle, since measurement of travel distance starts from the time the first toll charge command is received, there are no declines in the accuracy of measuring travel distance.

Meanwhile, for the above foregoing embodiment, if the signal of vehicular speed sensor 14 is monitored and if toll charging is not performed when there are no changes in that signal, then toll charging is not performed on vehicles mounted on car carriers.

As explained above, the second embodiment of the vehicle-mounted unit for the automatic toll collection system determines if the vehicle is within the toll chargeable area or not based on the travel distance. Accordingly, in the same way as the first embodiment, it is possible to reliably determine if the vehicle is within the toll chargeable area or not irrespective of heavy traffic or high-speed cruising. Furthermore, by maintaining the toll charge prohibition for a predetermined period of time after the vehicle leaves the toll chargeable area, double toll charging is prevented in case the vehicle returns to the toll chargeable area for certain reasons (accidents, obstacles, etc.) after leaving the toll chargeable area.

Moreover, according to the second embodiment of the vehicle-mounted unit of the automatic toll collection system, by starting measurements of the travel distance of the vehicle from the position of the vehicle at the start of the first toll charge operation, the starting point in time for the measurement of the travel distance coincides with the point in time the vehicle enters the toll-chargeable area. In this way, because travel distance coincides with toll chargeable distance, toll charge prohibition can be released immediately after a predetermined period of time lapses after the vehicle leaves the toll chargeable area or at the point in time the vehicle leaves the toll-chargeable area.

Meanwhile, the construction of the second embodiment of the present invention can be simplified as follows:

Carrier detector 20 can be omitted. For this case, because CPU 12 is always in RUN mode, CPU 12 is made to refuse toll charge commands until travel distance is equal to the toll chargeable distance (the case when box A of FIG. 5 is employed) or the computed amount of measurement counter 15b equals the toll chargeable distance of setting counter 15c (the case when box B of FIG. 5 is employed).

IC card 21 and card interface 22 can be omitted. For this case, because input-output operations of the toll charge information with IC card 21 can no longer be performed, CPU 12 stores toll charge information in RAM 17 and performs toll charge processing by renewing and reading that information.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An automatic toll collection system mounted on a vehicle, said system comprising:
   toll charge processing means for executing a toll charge process by performing predetermined communication with an interrogator when said vehicle is in a toll chargeable area where said system can receive toll charge commands from said interrogator;
   toll charge prohibiting means for prohibiting said toll charge processing means from executing further toll charge processes after said toll charge processing means finishes a first toll charge process;
   travel distance measuring means for measuring a travel distance of said vehicle from a position of said vehicle during said first toll charging process; and
   a toll charge prohibition continuation means for continuing said toll charge prohibition when said travel distance is less than a toll chargeable distance which corresponds to a size of said toll chargeable area.

2. The system of claim 1, further comprising communication prohibition release means for releasing said toll charge prohibition immediately when said travel distance exceeds said toll chargeable distance.

3. The system of claim 1, further comprising toll charge prohibition release means for releasing said toll charge prohibition when a predetermined amount of time elapses after said travel distance reaches said toll-chargeable distance.

4. The system of claim 1, wherein said toll charge prohibition means is further for prohibiting communication between said vehicle and said interrogator.

5. The system of claim 1, wherein:
   a toll charge command includes information on said toll chargeable area; and
   said toll charge processing means is further for receiving said toll charge command and for setting said size of said toll chargeable area based on said information on said toll chargeable area.

6. The system of claim 1, said toll charge processing means comprising:
   a CPU performing toll charge processing computations; and
   a carrier detector detecting a level of said toll charge command and providing a carrier detector signal to said CPU when said input is at a predetermined level;
   wherein said CPU is in a sleep mode before receiving said carrier detector signal and enters a run mode after receiving said carrier detector signal.

7. The system of claim 6, wherein said CPU is in said run mode when performing said toll charge processing operations and returns to said sleep mode after completing said toll charge processing operations.

8. The system of claim 1 wherein said travel distance measuring means is for starting said travel distance measurement from said position of said vehicle at a beginning of said first toll charging process.

9. The system of claim 8, said travel distance measuring means comprising:
   a CPU;
   a vehicle speed sensor;
   an input signal interface connected to said CPU and said vehicle speed sensor and providing a speed signal representative of an output of said speed sensor to said CPU; and
   a toll charge start detector sending a detection signal to said CPU when said toll charge start detector detects said beginning of said first toll charging process;
   wherein said input signal interface includes a level converter converting a level of said pulse signal from said vehicle speed sensor and generating said speed signal; and
   said CPU starts said vehicle-speed pulse count computation based on said speed signal when said detection signal is received from said toll charge start detector.

10. The system of claim 9, further comprising:
    an IC card storing toll charge information electrically connected to said CPU;
    wherein said CPU performs toll charge information input and output operations on the IC card through a card interface.

11. The system of claim 9, further comprising:
    a RAM electrically connected to said CPU;
    wherein said CPU performs toll charge operations by writing and reading information stored in the RAM.

12. The system of claim 8, said travel distance measuring means comprising:

a CPU;

a vehicle speed sensor generating a pulse signal representative of a speed of said vehicle;

an input signal interface connected to said CPU and said vehicle speed sensor and providing a speed signal representative of an output of said speed sensor to said CPU; and a toll charge start detector sending a detection signal to said CPU when said toll charge start detector detects said beginning of said first toll charging process;

wherein said input signal interface includes a level converter which converts a level of the pulse signal from the vehicle speed sensor and generates said speed signal to the CPU, a measurement counter which counts vehicle speed pulses based on the speed signal when a computation start command is received from the CPU responsive to a detection signal from the toll charging starting detection means, a setting counter storing a predetermined count corresponding to said toll chargeable distance, and a comparator which compares said predetermined count in said setting counter and a count of said measurement counter and provides a coincidence signal to the CPU when both counts are equal.

13. The system of claim 12, further comprising:

an IC card storing toll charge information electrically connected to said CPU;

wherein said CPU performs toll charge information input and output operations on the IC card through a card interface.

14. The system of claim 12, further comprising:

a RAM electrically connected to said CPU;

wherein said CPU performs toll charge operations by writing and reading information stored in the RAM.

15. A method of controlling toll charge processing operations in an automatic toll collection system mounted on a vehicle, said method comprising the steps of:

receiving a toll charge command from an interrogator;

performing toll charge processing responsive to said toll charge command;

inhibiting performance of subsequent toll charge processing;

measuring a distance travelled by said vehicle from a position of said vehicle during said toll charge processing; and enabling performance of subsequent toll charge processing when said distance exceeds a predetermined distance.

16. The method of claim 15, said enabling step comprising the steps of:

allowing a predetermined amount of time to elapse after said distance exceeds said predetermined distance; and enabling performance of subsequent toll charge processing after said predetermined amount of time elapses.

17. The method of claim 15, said measuring step comprising a step of measuring said distance from a position of said vehicle at a beginning of said performing step.

18. The method of claim 15, further comprising a step of reading said predetermined distance from an IC card.

19. The method of claim 15, further comprising a step of reading information corresponding to said predetermined distance from said toll charge command.

20. The method of claim 15, wherein:

said inhibiting step comprises a step of inhibiting receipt of subsequent toll charge commands; and said enabling step comprises a step of enabling receipt of subsequent toll charge commands.

21. The method of claim 15, wherein:

said inhibiting step comprises a step of placing a CPU performing said toll charge processing in a sleep mode; and said enabling step comprises a step of placing said CPU in a run mode.

22. The method of claim 21, said receiving step comprising a step of sending a wake-up signal to said CPU to cause said CPU to switch from said sleep mode to said run mode.

* * * * *